(12) United States Patent
Pelleng (10) Patent No.: US 8,769,829 B2
(45) Date of Patent: Jul. 8, 2014

(54) MECHANIZED PORTABLE ELECTRIC TOOL WITH TWO SHAFTS

(75) Inventor: Roger Pelleng, Pertuis (FR)

(73) Assignee: Pellenc (Societe Anonyme), Pertuis (FR)

( * ) Notice: Subject to any disclaimer, the term of this patent is extended or adjusted under 35 U.S.C. 154(b) by 276 days.

(21) Appl. No.: 13/002,735

(22) PCT Filed: Aug. 25, 2009

(86) PCT No.: PCT/FR2009/001029
§ 371 (c)(1),
(2), (4) Date: Mar. 15, 2011

(87) PCT Pub. No.: WO2010/023379
PCT Pub. Date: Mar. 4, 2010

(65) Prior Publication Data
US 2011/0173820 A1    Jul. 21, 2011

(30) Foreign Application Priority Data
Aug. 26, 2008  (FR) ..................................... 08 04711

(51) Int. Cl.
*B26B 15/00*    (2006.01)

(52) U.S. Cl.
USPC ................................. 30/228; 30/247; 30/341

(58) Field of Classification Search
USPC ........... 30/228, 249, 247, 197, 241, 194, 337, 30/347, 394, 251, 514, 340, 341; 200/505; 335/205; 56/12.1; D8/5
See application file for complete search history.

(56) References Cited

U.S. PATENT DOCUMENTS

| | | | | | |
|---|---|---|---|---|---|
| 2,697,457 | A | * | 12/1954 | Lawrence | 30/388 |
| 2,746,232 | A | * | 5/1956 | Ossino | 56/336 |
| 4,197,764 | A | * | 4/1980 | Auernhammer | 74/544 |
| 4,207,675 | A | | 6/1980 | Burchell et al. | |
| 4,254,549 | A | * | 3/1981 | McMullin | 30/251 |
| 4,282,652 | A | * | 8/1981 | Ballas, Sr. | 30/276 |
| 5,001,858 | A | * | 3/1991 | Frazar | 47/8 |
| 5,052,243 | A | * | 10/1991 | Tepic | 74/523 |
| RE34,358 | E | * | 8/1993 | Miller | 30/296.1 |
| 5,263,303 | A | * | 11/1993 | Stroud | 56/12.7 |
| 5,282,315 | A | * | 2/1994 | Martin | 30/251 |
| 5,347,800 | A | * | 9/1994 | Morgan | 56/335 |
| 5,459,985 | A | * | 10/1995 | Gedert | 56/17.2 |
| 5,826,667 | A | * | 10/1998 | Notaras et al. | 172/15 |
| 6,324,764 | B1 | * | 12/2001 | Watkins | 30/270 |

(Continued)

FOREIGN PATENT DOCUMENTS

DE    202007014836 U1    12/2007
JP    2006230263 A    9/2006

*Primary Examiner* — Omar Flores Sanchez
(74) *Attorney, Agent, or Firm* — Egbert Law Offices, PLLC (57) ABSTRACT

The invention relates to a portable electric tool having an active head motor-driven by an actuator and provided on the top end of a head-mounting shaft, the bottom portion of which has a handle, characterized in that a second shaft, or auxiliary shaft, is attached or arranged to be attachable onto the head-mounting shaft underneath and remote from said active head while forming, at least in the proximal portion thereof, an acute angle with said head-mounting shaft. The size of said auxiliary shaft being such that the free end thereof, provided with a handle, is located at or substantially at the handle being provided with the bottom part of the head-mounting shaft, one of said handles constituting the control handle of said actuator.

13 Claims, 11 Drawing Sheets

(56) References Cited

U.S. PATENT DOCUMENTS

| | | | |
|---|---|---|---|
| 6,488,511 B1 * | 12/2002 | Stewart | 439/32 |
| 7,574,805 B1 * | 8/2009 | Lindroth | 30/250 |
| 7,752,760 B2 * | 7/2010 | Baskar et al. | 30/517 |
| 7,930,833 B2 * | 4/2011 | Baskar et al. | 30/517 |
| 8,060,987 B1 * | 11/2011 | Troudt | 16/427 |
| 8,261,453 B2 * | 9/2012 | Huang | 30/92 |
| 2008/0127620 A1 | 6/2008 | Marcinczyk | |
| 2011/0005083 A1 * | 1/2011 | Scott et al. | 30/92 |

\* cited by examiner

MECHANIZED PORTABLE ELECTRIC TOOL WITH TWO SHAFTS

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention concerns a mechanized portable electric tool with two shafts, for example, for pruning or cutting trees or shrubs.

2. Description of Related Art Including Information Disclosed Under 37 CFR 1.97 and 37 CFR 1.98.

In the fields of agricultural and horticultural activities, and for maintaining open spaces and gardens, manual or mechanized pruning shears are customarily used for trimming whenever branches that require cutting are accessible and can be sectioned at arm's length by the user. In some cases, the branches that require cutting are not within arm's reach and it is necessary to use extension tools.

In the case of manual tools, so-called "universal" shears are used to cut small, low branches of woody plants or shrubs. These universal shears consist of two robust arms intersecting in the vicinity of one of their extremities and assembled, at their point of intersection, by means of an articulation, which delimits, on the one hand, two cutting blades forming the active head of the shears and, on the other hand, two shafts of equal length equipped with handles (see U.S.-D 464543).

A drawback inherent in this type of cutting tool resides in the fact that even though they can be used to reach distant branches, the force developed manually is inadequate and the opening of the two shafts occupies considerable space.

On the other hand, for cutting branches that cannot be reached with tools held in the hand or at arm's length, numerous mechanized portable electric tools have been proposed, installed at the upper extremity of a long shaft or pole, which may or may not be telescopic. US-2008/0052916 describes a cutting tool of this type manually actuated by means of a cord; WO-2008/023705 describes an electric pruning shears installed at the end of a long shaft, while U.S. Pat. No. 4,207,675 describes a chain saw mounted at the upper extremity of a long shaft.

Such tools can be used to reach and cut relatively high branches, depending on the length of the pole.

However, while such tools can be held with both hands during use, both of the user's hands must necessarily be placed one after the other along the shaft or pole, thereby limiting the height that can be achieved and the possibility of instantaneously obtaining the proper positioning of the active head of the tool.

BRIEF SUMMARY OF THE INVENTION

The invention proposes to provide users with a two-shaft portable electric tool capable of overcoming the aforementioned drawbacks of known portable electric pole tools.

According to the invention, this objective is realized by means of a portable electric tool having a motor-driven active head controlled by an actuator and installed at the upper extremity of a head-mounting shaft whose lower portion is equipped with a handle. The tool being noteworthy primarily in that a second, or auxiliary, shaft is affixed or arranged in such a way that it can be affixed to the head-mounting shaft, below and at a distance from said active head, forming, at least in its proximal part, an acute angle with said head-mounting shaft. The auxiliary shaft being configured so that the handle-equipped free end thereof is found at or appreciably at the handle with which the lower part of the head-mounting shaft is provided, one of said handles being arranged so as to constitute the actuator control handle.

This portable electric tool provides several advantages, such as, for example:

- the ability to reach greater heights by reason of the fact that during its use, both hands of the operator are found at the same position, unlike existing portable electric tools, where the hands of the user must be placed one above the other on the pole;
- the ability to more rapidly guide and position the active head with precision among the branches while holding the tool with both hands;
- improved ease of use resulting from holding the tool with the arms slightly spread;
- the ability of a right or left-hand operator to use the tool, with the option of mounting the active head and/or control handle in orientable manner, with the possibility of 180° degree rotation;
- the ability to work either above the ground or near the ground, eliminating the need for the user to bend; and
- the ability to operate with tools having an adjustable-length pole.

BRIEF DESCRIPTION OF THE DRAWINGS

The above objectives, characteristics, and advantages, as well as others, can be better understood from the following description and attached drawings, in which:

FIG. 1 is a perspective view of a first embodiment of a portable electric tool with two shafts according to the invention, with handles forming an angle α and the actuator of the active portion found in the lower portion.

FIG. 3 is perspective view similar to FIG. 1, representing the tool in its left-hand version.

FIG. 4 is a perspective view of a second embodiment of the portable electric tool with two shafts according to the invention, with parallel handles and the actuator of the active part found in the lower portion.

FIG. 6 is a perspective view similar to FIG. 4, representing the tool in its left-hand version.

FIG. 7 is a perspective view of a third embodiment of a portable electric tool with two shafts according to the invention, with handles forming an angle α and the actuator of the active portion found in the upper portion.

FIG. 8 is an exploded perspective view of FIG. 7.

FIG. 10 is a perspective view of a fourth embodiment of the portable electric tool with two shafts according to the invention, with parallel handles and the actuator of the active part found in the upper portion.

FIG. 11 is an exploded perspective view of FIG. 10.

FIG. 12 is perspective view similar to FIG. 10, representing the tool in its left-hand version.

FIGS. 13A and 13B are perspective views of a fifth embodiment of the portable electric tool with two shafts according to the invention, wherein one of the shafts is telescopic; in FIG. 13A, the tool is represented in its shortened state, whereas in FIG. 13B, said tool is shown in its extended state.

Reference is made to said drawings to describe advantageous, but in no way limiting, embodiments of the portable electric tool with two shafts according to the invention.

DETAILED DESCRIPTION OF THE INVENTION

In the present description and in the claims, words such as "upper," "lower," "top," "bottom," and "below," are used with reference to the most recent working position of the tool that enables it to reach the upper branches of trees. Therefore these terms have no restrictive character.

The invention concerns portable electric tools of a type having a motor-driven active head 1, installed at the upper extremity of a shaft or pole 2 whose lower extremity is equipped with a handle 3 for holding said head-mounting shaft 2. Preferably, handle 3 is one that can be used to control the actuator 6 used to drive the mobile element or elements of said active head 1, as described below.

The length of head-mounting shaft 2 may be adapted to the work for which the tool is intended. It may be formed from a single tube or include a pole comprising two or more tube sections assembled telescopically (FIGS. 13A and 13B), so that its length can be adjusted.

Active head 1 may comprise various portable electric tools. In the attached drawings, the active head shown is an electric pruning shears. However, it could be of a different kind of tool, for example, an electric chain saw, a head for harvesting small fruits by mechanical shaking (for example, see EP-1116432), etc.

According to the invention, a second, or auxiliary, shaft 4 is affixed or arranged so it may be affixed, by means of one of its extremities, to head-mounting shaft 2, below and at a distance from active head 1, thus forming an acute angle α with said head-mounting shaft, at least in the proximal portion thereof. This auxiliary shaft 4 is shorter than head-mounting shaft 2 and is configured so that its free, handle-5-equipped, lower extremity is found at or appreciably at control handle 3 with which the lower portion of said head-mounting shaft 2 is equipped.

According to the embodiment shown in FIGS. 1-3 and 7-9, head-mounting shaft 2 and auxiliary shaft 4 gradually diverge from their junction, whereby the separation at handles 3 and 5 is such that the tool can be easily gripped and handled with two hands.

According to a second embodiment shown in FIGS. 4-6 and 10-12, the lower, or distal, portion 4a of the second, or auxiliary, shaft 4 equipped with handle 5 is curved or bent in the direction of the lower portion of head-mounting shaft 2 equipped with control handle 3, in such a way that said handles 3 and 5 are oriented in parallel or appreciably parallel, which provides improved comfort during use of the tool.

According to another embodiment shown in FIGS. 13A and 13B, head-mounting shaft 2 includes an adjustable-length pole formed of two sections 2a, 2b telescopically connected and equipped by a locking means known per se, thereby enabling rigid assembly of these two sections after adjustment to the desired length.

In this case, auxiliary shaft 4 is affixed to the lower section 2a of pole 2.

Auxiliary shaft 4 can be permanently affixed on head-mounting shaft 2. The upper extremity thereof can also be arranged in a manner known per se to allow the removable attachment thereof to said head-mounting shaft.

In all cases, auxiliary shaft 4 forms, at least in its proximal portion, an acute angle α with head-mounting shaft 2, thereby enabling the user to grasp the tool with both hands placed appreciably at the same level, with a separation of hands and arms, thereby resulting in a position of comfort.

Actuator 6, including for example an electrically operated geared motor, can be placed, in a manner known per se:
- on the upper portion of head-mounting shaft 2, near active head 1, as shown in FIGS. 7 to 12; or
- on the lower portion of said head-mounting shaft, near handle 3, as illustrated in FIGS. 1 to 6.

The control means of actuator 6 is installed in the lower portion of the tool. This control means may consist of:
- handle 3, equipping the lower extremity of head-mounting shaft 2, as shown in FIGS. 1 to 8
- handle 5, arranged in the lower portion of auxiliary handle 4, as shown in FIGS. 12 and 9.

Figure 2:
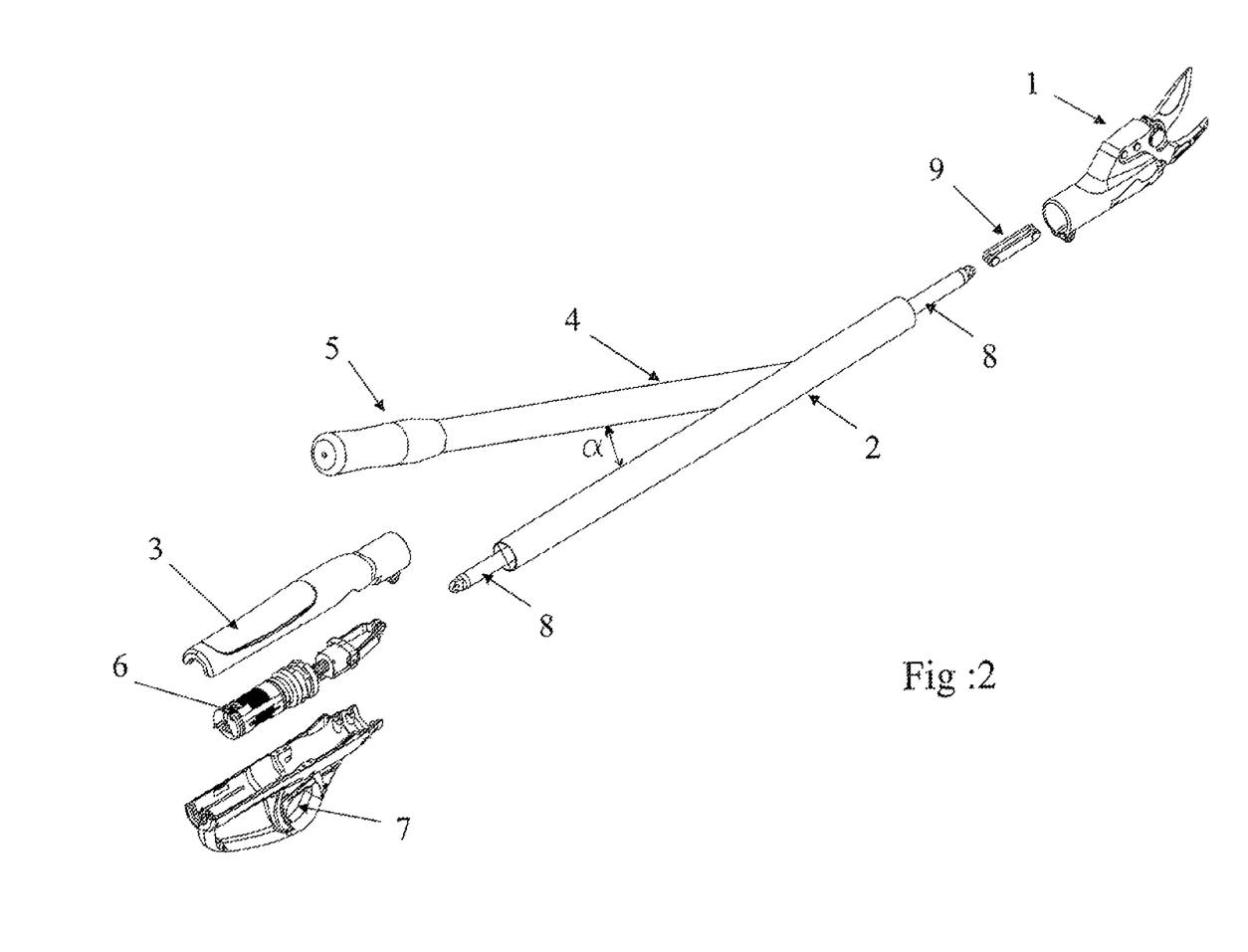
FIG. 2 is an exploded perspective view of FIG. 1.
Figure 5:
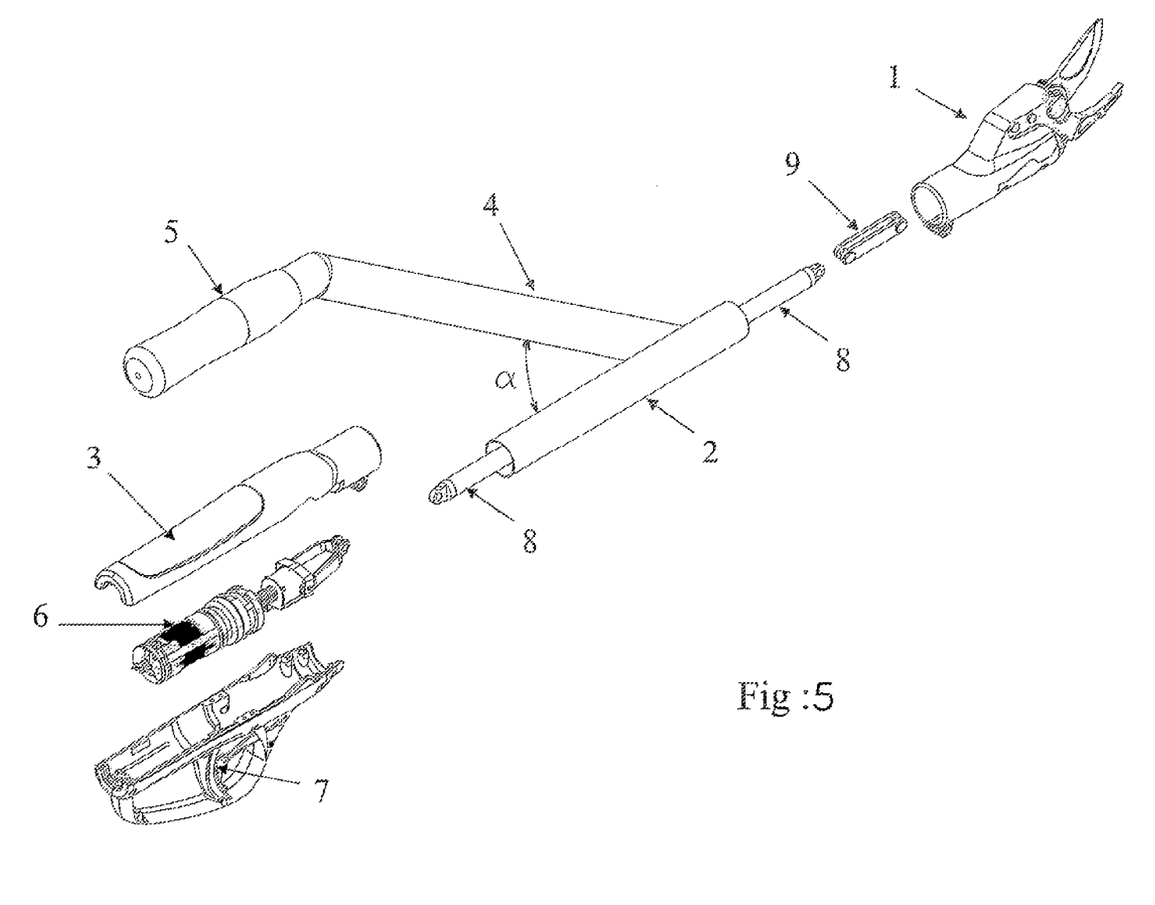
FIG. 5 is an exploded perspective view of FIG. 4.

In FIGS. 2 and 5, actuator 6 is shown at the lower extremity of head-mounting shaft 2 at control handle 3, whereby trigger 7 thereof can be used to control said actuator 6, which, by means of rod 8 and transmission link 9, can be used to operate the moving element of active head 1.

Figure 9:
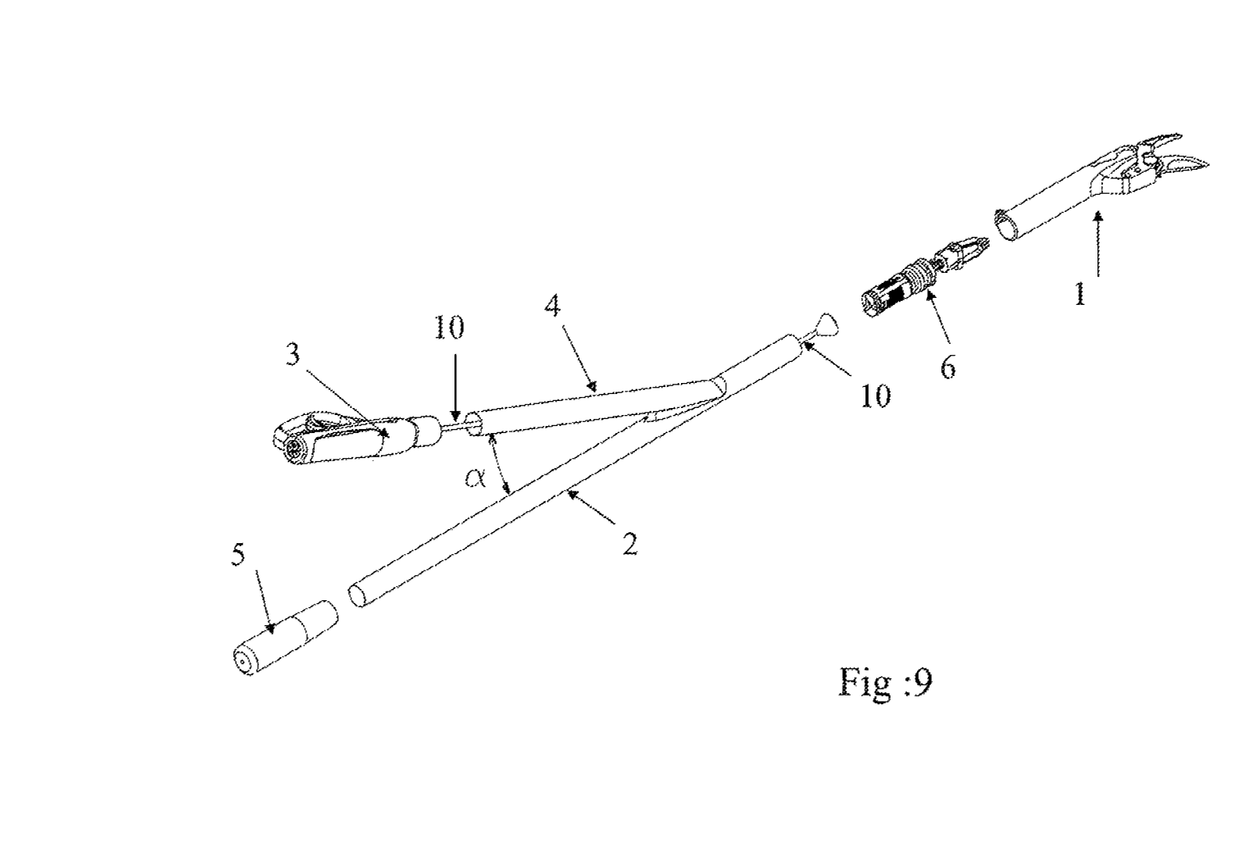
FIG. 9 is perspective view similar to FIG. 8, representing the tool in its left-hand version.

In FIGS. 8 and 9, can be seen an electrical cable 10 lodged in tube 2 and providing the electrical connection between control handle 3 and geared motor 6 installed on the upper portion of head-mounting shaft 2.

According to the embodiment shown in FIG. 12, the electrical cable connecting control handle 5 to geared motor 6 is lodged in auxiliary handle 4 and traverses the upper portion of head-mounting shaft 2.

Control handle 3 or control handle 5 can be pivotally mounted by means of any system or device known per se, with the possibility of approximately 180° rotation, the orientation thereof being such as to accommodate users (right-handed or left-handed) and their habits or practices, as shown in FIGS. 3 and 6.

Active head 1 can also be mounted with the possibility of pivoting, on the upper portion of the head-mounting shaft, by means of any system or device known per se, with the possibility of approximately 180° rotation, the orientation thereof being such as to accommodate users (right-handed or left-handed) and their habits or practices, as shown in FIGS. 3 and 6.

In the embodiment in which actuator 6 is positioned on the upper portion of head-mounting shaft 2, it is possible, as indicated previously, to transition from the right-handed version to the left-handed version, by turning handle 3 and active head 1, but it is also possible to reverse handles 3 and 5, for the connection between the control handle and said actuator is realized with cable 10, which can pass either through tube 2 or tube 4, as shown in FIGS. 8 and 9, handle 5 thereby constituting the tool's control handle (FIG. 9).

I claim:

1. A portable electric tool comprising:

a head-mounting shaft having a first end and a second end and a longitudinal axis;

a motor-driven head affixed to said first end of said head-mounting shaft, said motor-driven head being aligned with said longitudinal axis of said head-mounting shaft;

an actuator cooperative with said motor-driven head so as to control an operation of said motor-driven head;

a first handle affixed to said second end of said head-mounting shaft, said first handle aligned with said longitudinal axis of said head-mounting shaft;

an auxiliary shaft having one end affixed to said head-mounting shaft at a location between said first and second ends thereof and closer to said first end of said head-mounting shaft than to said second end of said head-mounting shaft, said auxiliary shaft having a longitudinal axis extending at an acute angle with respect to said longitudinal axis of said head-mounting shaft, said auxiliary shaft configured to extend in a horizontal plane when said head-mounting shaft extends in such horizontal plane, said auxiliary shaft having an opposite end spaced from said second end of said head-mounting shaft;

a second handle affixed to said opposite end of said auxiliary shaft, said second handle in spaced relation to and adjacent to and coplanar with said first handle, one of said first and second handles having a controller thereon suitable for controlling an operation of said actuator, said second handle aligned with said longitudinal axis of said auxiliary shaft.

2. The portable electric tool of claim 1, said auxiliary shaft being bent or curved such that said second handle is in substantially parallel relation to said first handle.

3. The portable electric tool of claim 1, said head-mounting shaft comprising an adjustable length pole formed of a plurality of telescopically-connected sections, said head-mounting shaft having a lock suitable for fixing a length of said head-mounting shaft, said auxiliary shaft affixed to one of said plurality of telescopically-connected sections.

4. The portable electric tool of claim 1, said actuator positioned at or adjacent to said first end of said head-mounting shaft.

5. The portable electric tool of claim 1, said actuator positioned at or adjacent to said second end of said head-mounting shaft.

6. The portable electric tool of claim 1, said controller affixed to said first handle.

7. The portable electric tool of claim 1, said controller affixed to said second handle.

8. The portable electric tool of claim 1, said first handle being rotatable for 180° about said longitudinal, axis of said head-mounting shaft.

9. The portable electric tool of claim 1, said second handle being rotatable for 180° about said longitudinal axis of said head-mounting shaft.

10. The portable electric tool of claim 1, said motor-driven head being rotatable for 180° about said longitudinal axis of said head-mounting shaft.

11. The portable electric tool of claim 1, said motor-driven head comprising pruning shears.

12. The portable electric tool of claim 1, said motor-driven head comprising a chain saw.

13. The portable electric tool of claim 1, said motor-driven head comprising a small-fruit gathering head.

* * * * *